United States Patent [19]

Hicks et al.

[11] Patent Number: 5,529,089
[45] Date of Patent: Jun. 25, 1996

[54] MODULAR COMPRESSED NATURAL GAS FUEL UNIT

[75] Inventors: Irwin A. Hicks; Joseph P. Lofink, Jr., both of Zanesville, Ohio

[73] Assignee: Williams Controls, Inc., Portland, Oreg.

[21] Appl. No.: 960,036

[22] Filed: Oct. 13, 1992

[51] Int. Cl.⁶ .................................................. F16K 27/12
[52] U.S. Cl. .......................... 137/382; 137/68.19; 137/74; 137/340; 137/377; 137/588; 137/376; 222/3; 62/50.7
[58] Field of Search .................... 137/68.1, 340, 137/341, 377, 382, 588, 376, 68.19, 74; 222/3; 123/1 A; 62/50.7

[56] References Cited

U.S. PATENT DOCUMENTS

| | | | |
|---|---|---|---|
| 2,341,579 | 2/1944 | Sundstrom | 222/3 |
| 2,456,913 | 12/1948 | Buttner et al. | 222/3 |
| 2,623,362 | 12/1952 | Zenbe | 222/3 |
| 2,687,018 | 8/1954 | Baldwin, Jr. et al. | 222/3 |
| 2,855,759 | 10/1958 | Chaiser et al. | 62/50.7 X |
| 2,951,502 | 9/1960 | Norway et al. | 62/50.7 X |
| 3,148,800 | 9/1964 | Isnardi et al. | 137/376 X |
| 4,630,637 | 12/1986 | Furst et al. | 137/340 |
| 4,635,676 | 1/1987 | Reilley | 137/382 X |
| 4,802,502 | 2/1989 | Williams | 137/377 X |
| 5,058,758 | 10/1991 | Suddeth | 137/382 |
| 5,081,977 | 1/1992 | Swenson | 123/1 A |

*Primary Examiner*—John Rivell

[57] ABSTRACT

The present invention relates to a modular compressed natural gas fuel unit comprising generally a tank adapted to contain compressed natural gas and a fuel supply unit integrally attached to the main valve of the tank.

10 Claims, 2 Drawing Sheets

MODULAR COMPRESSED NATURAL GAS FUEL UNIT

TECHNICAL FIELD

The present invention relates to a modular compressed natural gas fuel unit comprising generally a tank adapted to contain compressed natural gas and a fuel supply unit integrally attached to the main valve of the tank.

BACKGROUND OF THE INVENTION

The present invention relates to a modular compressed natural gas fuel unit.

Owing chiefly to the increasing costs of liquid petroleum fuels such as diesel fuel, gasoline and home heating oil, and the environmental concerns relating to their use, there has been increased attention focused on natural gas as an alternative fuel source.

Because natural gas is normally supplied in the form of compressed natural gas (CNG) for use in the vehicles, there has been a need to reduce and standardize the space taken up by CNG fuel units. It has also been found desireable to standardize CNG fuel unit spatial and dimensional requirements.

One of the problems in the original manufacture of CNG-burning vehicles, or the conversion of liquid fuel vehicles to CNG, is that each individual vehicle design often has required that the individual components of the CNG fuel system be placed at different locations on each vehicle as the design of each vehicle permits.

The vehicles into which such CNG fuel units have been incorporated have ranged from relatively small fork lifts and other smaller utility vehicles to vans and large fleet trucks. Such individual tailoring of CNG fuel units for each vehicle design and configuration involves a great deal of trial and error in placing the individual components of the CNG system in locations where they can function safely and effectively. Also, with the individual CNG fuel unit components being separated, tailoring of a CNG fuel unit for a particular vehicle involves the tailoring of the gas conduits of varying strengths and safety ratings to connect the portions of the CNG fuel unit, ultimately reaching the combustion chamber of the vehicle's engine. Individual tailoring of CNG fuel units accordingly requires the additional time and expense necessary to fit, configure and individually produce each such unit. This is most problematic in the field of conversion of diesel fuel or gasoline-burning vehicles to CNG due to the wide variety of vehicles one can encounter. However, this problem could also adversely impact the original manufacture of CNG vehicles as the designs of such originally manufactured vehicles change over time.

Accordingly, it is an object of the present invention to provide a modular CNG fuel unit requiring less total space and whose spatial and dimensional requirements may be standardized to make more efficient the utilization of CNG fuel units in a wide variety of vehicles, whether originally manufactured for or converted to CNG combustion.

It is also an object of the present invention to be able to reduce the time, effort and expense of non-CNG-burning vehicles to CNG combustion by reducing the amount of fitting and configuring of individual component parts of the CNG fuel unit and the necessary customizing of connection means between such individual component parts.

Yet another object of the present invention is to provide a modular CNG fuel unit which can be mounted to a variety of structures such as a mobile home or other temporary dwelling, or on any variety of vehicles adapted for CNG combustion such as fork lifts or other work vehicles, automobiles, vans or trucks.

Other advantages and the solution to other problems existing in the prior art may become apparent to one of ordinary skill upon the manufacture or use of a modular CNG fuel unit in accordance with the present invention.

SUMMARY OF THE INVENTION

Toward the foregoing objectives and toward solving the foregoing problems, the present invention comprises a modular compressed natural gas unit which features a tank adapted to contain compressed natural gas, and a compressed natural gas supply unit integrally attached to the tank. The present invention in its broadest form comprises a tank adapted to contain compressed natural gas, with the tank having an opening to the interior of the tank and a main valve in fluid communicative relationship with the opening. The present invention also comprises a compressed natural gas supply unit which is in fluid communicative relationship with the main valve, and which comprises at least (a) a first stage regulator; (b) a second stage regulator; and (c) an inlet port; with the compressed natural gas supply unit integrally attached to the main valve.

The tank which may be used in the present invention may be selected from any type tank adapted to contain a compressed natural gas. Such types of tanks include tanks fabricated from steel or aluminum metal, or those produced from wound fiberglass.

The main valve or cylinder valve may be selected from any valve appropriate for use with the corresponding fuel tank cylinder. Such valves will be selected for their desired pressure rating, flow rate and other relevant characteristics. The main valve body may also include an over-pressure release disk and/or a fire-pressure release disk in accordance with known arrangements, to help prevent accidents or explosions in the event of over filling or fire.

The first stage regulator will normally be supplied with a heating unit adapted to heat the compressed natural gas as it leaves the first stage regulator and prior to entering the second stage regulator. Such heating units may be selected from any appropriate heating means including those selected from the group consisting of fluid jacket heating units and electrical resistance heating units.

The compressed natural gas supply unit optionally may also include a third stage regulator in order to provide an additional pressure drop as desired depending upon the vehicle or engine which is to be supplied by the modular compressed natural gas fuel unit of the present invention.

The compressed natural gas supply unit may also additionally comprise a blow-out valve disposed between the main valve and the first stage regulator, which is adapted to interrupt the flow of the compressed natural gas from the tank in the event of failure of the supply unit to maintain a flow rate of compressed natural gas from the tank below about the critical flow velocity of the compressed natural gas.

The supply unit may also comprise a check valve disposed between the refilling port and the main valve. The individual elements of the compressed natural gas supply units may be connected to one another by the use of connection pieces such as straight nipple connections and male or female connections as shown in the accompanying drawings. It is also contemplated that some or all the individual elements might be integrally manufactured to obtain the same arrangement.

The tank may be secured by a mounting bracket which is adapted to secure the tank to a surface. The components of the supply unit may be shielded by protective cowling integrally attached to the mounting bracket and/or to the tank itself.

The modular compressed natural gas fuel unit may be mounted on any appropriately safe surface of a vehicle such as in the bed or below the cab of a truck, in the trunk of a car, or on the back of a fork lift.

The tank may be of any size appropriate to supply some or all of the fuel requirements for the vehicle with which it is used.

DETAILED DESCRIPTION OF THE PREFERRED EMBODIMENT

The following is a detailed description of one embodiment of the present invention as applied to create a modular compressed natural gas supply unit for a fork lift, and is presently considered to be the best mode of carrying out the present invention for that particular application.

Figure 1:
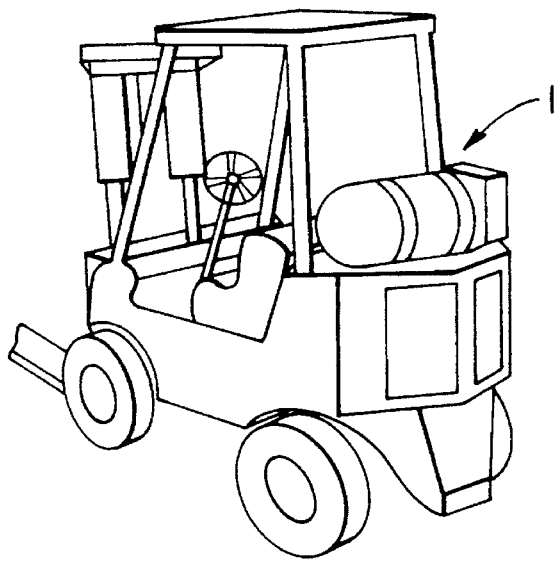
FIG. 1 is an environmental view showing a modular compressed natural gas fuel unit mounted on a forklift in accordance with one embodiment of the present invention.
Figure 2:
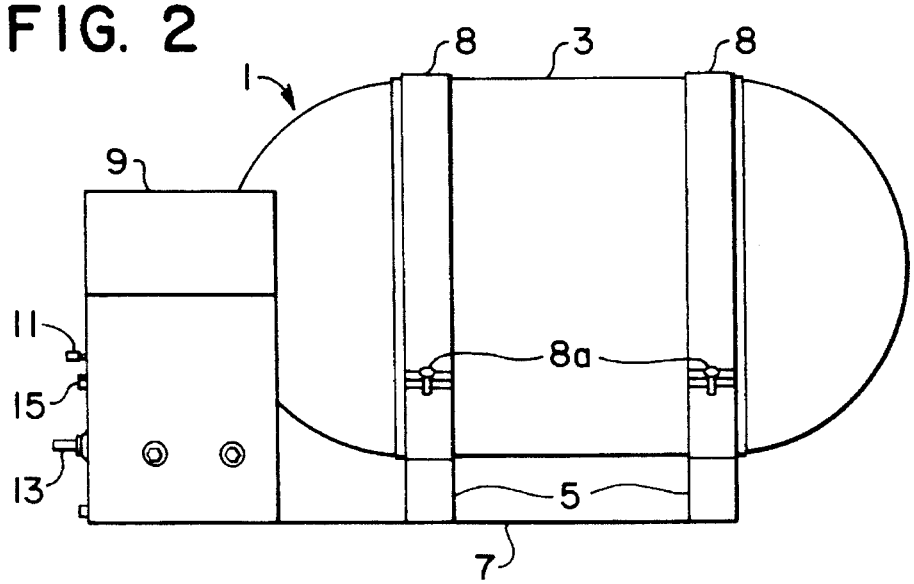
FIG. 2 is a side elevational view of a modular compressed natural gas fuel unit, including mounting bracket and protective cowling, in accordance with one embodiment of the present invention.

FIG. 1 shows a modular compressed natural gas fuel unit 1, mounted on a forklift. FIG. 2 shows a base plate 7 attached to a surface on the back of the forklift.

FIG. 2 shows the modular CNG fuel unit 1, with a more detailed view of the CNG tank 3, and the O-bands 8 closed by bolts 8a. The O-bands 8 are held in position by mounting bracket 5 which in turn is attached to a base plate 7. FIG. 2 also shows the position of the protective cowling 9, refilling port 13, refilling valve 11, and high pressure relief outlet 15 such as is a commercially available from Meco Company of St Louis, Mo.

Figure 3:
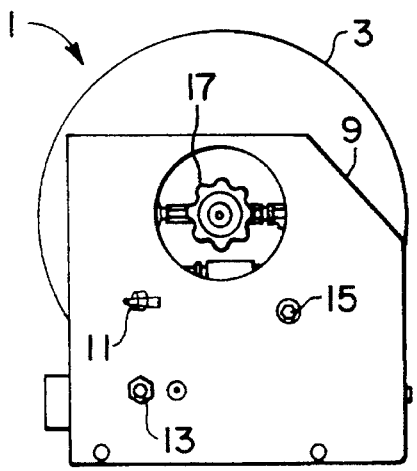
FIG. 3 is a side elevational view of a modular compressed natural gas fuel unit, including mounting bracket and protective cowling, in accordance with one embodiment of the present invention.

FIG. 3 shows another view of the modular CNG fuel unit 1, and the position of the CNG tank 3 and the protective cowling 9. The protective cowling 9 is shown to position the refilling port valve 11, the refilling port 13, and the high pressure relief outlet 15.

Figure 4:
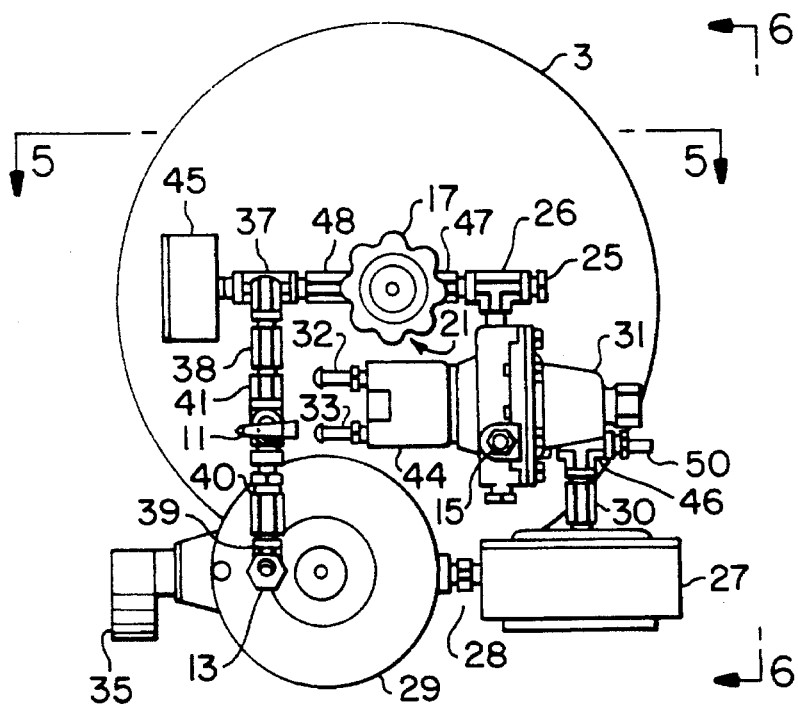
FIG. 4 is a side elevational view of a modular compressed natural gas fuel unit, without mounting bracket and protective cowling, in accordance with one embodiment of the present invention.

FIG. 4 shows a view of the modular CNG fuel unit 1 with the mounting bracket 5, O-bands 8 and base plate 7 removed. FIG. 4 shows the CNG tank 3 having an opening (not shown) and a main cylinder valve body (not shown) in fluid communicative relationship with the interior of the CNG tank 3. The main cylinder valve body is obscured by main cylinder valve handle 17 in FIG. 4. The main cylinder valve body in the displayed embodiment has four exit ports. The first exit port is used to hold and over-pressure disk 21 and the second exit port is used to contain a fire pressure disk 23. These disks are placed in accordance with known valve construction.

Turning first to the gas supplying branch of the compressed natural gas supply unit, this branch extends from the third exit port. From the third exit port short connector 47 attaches to male branch tee connector 26 which in turn is fitted with a tank plug 25. The male branch tee connector 26 also is connected to high pressure regulator 31, such as one commercially available from Meco Company. The high pressure regulator 31 is fitted with heater jacket 44 which, in this case, is a fluid type heater with fluid inlet connection 32 and fluid outlet connection 33, respectively adapted to receive and discharge heated fluids such as engine coolant fluid. Also shown is high pressure relief outlet 15 also commercially available from Meco Company. Exiting the high pressure regulator 31 is male tee connector 46, one branch of which is connected to a test port 50 for testing the regulator 31. The other branch of male tee connector 46 is coupled by a connector 30 to a vacuum shutoff unit 27. Vacuum shutoff unit 27 in turn is connected to the second stage regulator 29 by a short nipple connector 28. The gas is supplied from second stage regulator 29 via a nylon Ell fitting 35. The gas is connected from fitting 35 to the combustion chamber of the vehicle engine via gas hoses and fittings in accordance with the present practice. Such hoses and fittings include low pressure hoses compatible with natural gas, and barb-type fittings and appropriate clamping devices.

The fourth exit port from the main cylinder valve body (in this case used for the filling branch of the supply unit port) is connected via connector 48 to female tee connector 37. Female tee connector 37 in turn holds fix box gauge 45 (such as commercially available from McDaniel Company of Luling, La.). The other branch of female tee connector 37 is connected via long nipple connector 38 to a ball valve 41 (commercially available from Hoke Company of Cresskill, N.J.). Ball valve 41 is separated from check valve 40 (also commercially available from Hoke Company) by refilling port valve 11. Check valve 40 is in turn connected via a street Ell connector 39 to refilling port 13.

Figure 5:
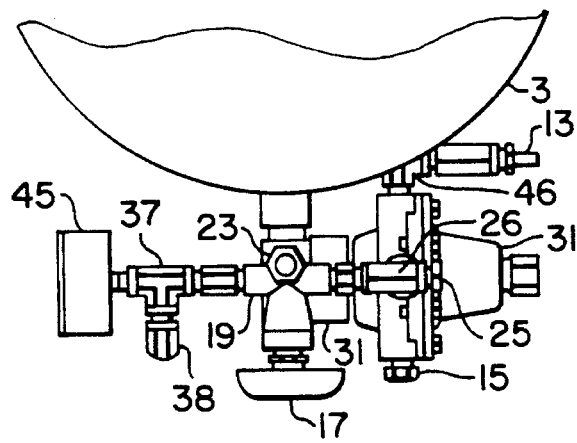
FIG. 5 is a sectioned top plan view, taken from the perspective of line 5—5 in FIG. 4, in accordance with one embodiment of the present invention.

FIG. 5 shows a sectioned top plan view as viewed from the perspective of line 5—5 of FIG. 4. In this view the position of the CNG tank 3, its opening and main cylinder valve body 19 can be appreciated. Also shown in this view is main cylinder valve handle 17 and fire pressure disk 23. FIG. 5 also shows male branched tee connector 26 coupled to the tank plug 25 and high pressure regulator 31. Also seen from this perspective is the connection between male tee connector 46 and test port 50. On the other side of the main cylinder valve body can be seen a portion of the refilling branch of the compressed natural gas supply unit comprising connector 48, female tee connector 37, optional fixed box gauge 45 and a portion of long nipple connector 38.

Figure 6:
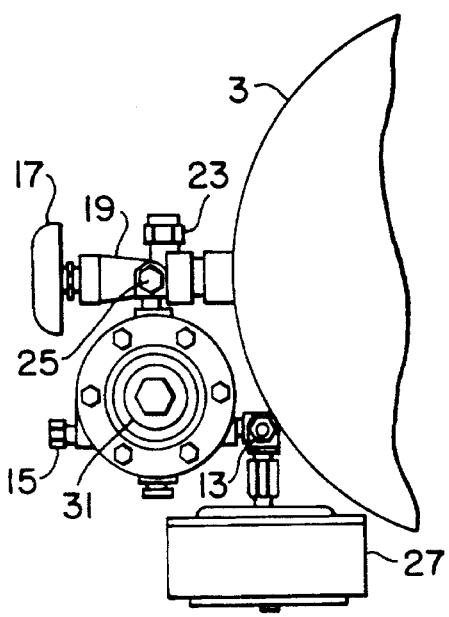
FIG. 6 is a sectioned side elevational view taken along the prospective of line 6—6 in FIG. 4, in accordance with one embodiment of the present invention.

FIG. 6 shows a side view of a portion of the compressed natural gas supply unit as seen from the perspective of line 6—6 of FIG. 4. From this perspective, main valve body 19 can be seen in its fluid communicative relationship with the opening of CNG tank 3. The main cylinder valve handle 17, fire pressure disk 23 and tank plug 25 can also be seen. Also shown are other portions of the fueling branch of the compressed natural gas supply unit including high pressure regulator 31, high pressure relief outlet 15, test port 50, connector 30 and vacuum shut off unit 27.

As can be appreciated from the foregoing disclosure, the present invention allows the production of a CNG gas fuel unit wherein the unit exclusive of the tank and supply hose (that connecting the unit to the combustion chamber) has a greatly reduced exclusionary volume in comparison to prior art arrangements. For instance, the present invention allows the production of a gas supply unit where there is less than that of the tank(s) with which it is associated. The outside dimensions of the CNG gas fuel unit exclusive of tank(s) and supply hose encompass a volume less than 2 cubic feet and in the range of from about 2 cubic feet to about 1.5 cubic feet to as little as 1 cubic foot.

In view of the foregoing disclosure, it will be obvious to and within the reach of one of ordinary skill in the field of compressed natural gas storage and delivery to make modifications and alterations, including the substitution of equivalent materials and parts, the re-arrangement, integration or disintegration of elements of the invention without departing from the spirit of the invention as reflected in the foregoing disclosure and the appended claims.

What is claimed is:

1. A modular compressed natural gas fuel unit, comprising:
   a tank having an interior and adapted for containing compressed natural gas, said tank having an opening to the interior of said tank and a main valve in fluid communication with said opening;
   a compressed natural gas supply unit in fluid communication with said main valve, said supply unit including at least
   (a) a first stage regulator,
   (b) a second stage regulator, and
   (c) a refilling port in fluid communication with said main valve;
   a mounting bracket for securing said tank;
   protective cowling for shielding said supply unit, and
   a base plate adapted to be mounted on a supporting surface, said mounting bracket and said protective cowling being carried on said base plate.

2. The modular compressed natural gas unit of claim 1, wherein said base plate includes a pair of opposite ends, said cowling is disposed adjacent one end of said base plate, and said tank is disposed adjacent the other end of said base plate.

3. The modular compressed natural gas unit of claim 1, wherein said tank and said cowling are mounted in side-by-side relationship on said base plate.

4. The modular compressed natural gas unit of claim 1, including banding surrounding said tank for securing said tank on said mounting bracket.

5. The modular compressed natural gas unit of claim 1, wherein said supply unit includes fittings extending through said cowling and providing user access to said supply unit externally of said cowling.

6. The modular compressed natural gas unit of claim 1, wherein said cowling includes a wall having an access opening through which a user may gain access to said main valve.

7. The modular compressed natural gas unit of claim 1, wherein:
   said tank is elongated and has a pair of opposite ends,
   said opening is defined in one of said ends of said tank, and
   said supply unit is disposed at said one end of said tank.

8. The modular compressed natural gas unit of claim 1, wherein said refill port extends outwardly through said cowling to provide access to said refilling port external of said cowling.

9. The modular compressed natural gas unit of claim 2, including a refilling valve in fluid communication with said refilling portion and extending outwardly through said cowling to provide access to said refilling valve external of said cowling.

10. A modular compressed natural gas fuel unit, comprising:
    a tank having an interior and adapted for containing compressed natural gas, said tank having an opening to the interior of said tank and a main valve in fluid communication with said opening;
    a compressed natural gas supply unit in fluid communication with said main valve, said supply unit including at least
    (a) a first stage regulator,
    (b) a second stage regulator, and
    (c) a refilling port in fluid communication with said main valve;
    said supply unit being integrally attached to said main valve: and,
    a mounting bracket adapted to secure said tank,
    said supply unit being shielded by a protective cowling, said protective cowling being integrally attached to said mounting bracket.

* * * * *